US008642158B2

(12) United States Patent
Bogue et al.

(10) Patent No.: US 8,642,158 B2
(45) Date of Patent: Feb. 4, 2014

(54) REPAIR OF COMPOSITE SANDWICH STRUCTURES

(75) Inventors: William Bogue, Hebron, CT (US); Richard B. Ringler, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 330 days.

(21) Appl. No.: 13/072,925

(22) Filed: Mar. 28, 2011

(65) Prior Publication Data

US 2011/0177285 A1 Jul. 21, 2011

Related U.S. Application Data

(62) Division of application No. 11/455,570, filed on Jun. 19, 2006, now Pat. No. 7,935,205.

(51) Int. Cl.
*B32B 3/12* (2006.01)
*B32B 33/00* (2006.01)
*B32B 43/00* (2006.01)

(52) U.S. Cl.
USPC ............... 428/116; 428/73; 181/292; 156/98; 403/204; 403/341

(58) Field of Classification Search
CPC .............................. B29C 73/10; B29C 73/105
USPC ............... 428/73, 116–118, 77–79, 98–104; 156/98, 214, 216; 181/292; 244/123.13, 123.6, 131, 132; 29/462, 29/464, 402.01–402.21, 897.1; 248/675; 52/481.1, 783.1; 403/204, 205, 286, 403/292, 293, 294, 295, 340, 341
See application file for complete search history.

(56) References Cited

U.S. PATENT DOCUMENTS

| 4,273,818 | A | * | 6/1981 | Buchs | 428/116 |
| 4,668,317 | A | * | 5/1987 | Snyder | 156/98 |
| 4,671,470 | A | * | 6/1987 | Jonas | 428/116 |
| 4,671,841 | A | | 6/1987 | Stephens | |
| 4,820,564 | A | | 4/1989 | Cologna et al. | |
| 4,855,182 | A | * | 8/1989 | Ondrejas et al. | 428/116 |
| 5,034,254 | A | | 7/1991 | Cologna et al. | |
| 5,252,279 | A | * | 10/1993 | Gore et al. | 428/131 |
| 5,653,836 | A | | 8/1997 | Mnich et al. | |

(Continued)

FOREIGN PATENT DOCUMENTS

| FR | 2773645 | 7/1999 |
| JP | 61-165462 | 7/1986 |
| WO | 98/29002 | 7/1998 |

OTHER PUBLICATIONS

Sam Dastin, "Repairing Advanced Composite Materials," Article, Feb. 1986, pp. 86-90, vol. 58, No. 4, Machine Design, Penton Media, Cleveland, Ohio.

(Continued)

*Primary Examiner* — David Sample
*Assistant Examiner* — Nicholas W Jordan
(74) *Attorney, Agent, or Firm* — Carlson, Gaskey & Olds, P.C.

(57) ABSTRACT

A composite component includes a honeycomb, a skin bonded to the honeycomb, a repair section bonded adjacent to the skin, and at least one cover secured on at least a portion of the repair section to resist peeling of the repair section.

17 Claims, 3 Drawing Sheets

(56) References Cited

U.S. PATENT DOCUMENTS

| | | | |
|---|---|---|---|
| 5,776,579 A * | 7/1998 | Jessup et al. | 181/292 |
| 5,912,442 A | 6/1999 | Nye et al. | |
| 5,975,237 A | 11/1999 | Welch et al. | |
| 6,335,203 B1 * | 1/2002 | Patel et al. | 422/404 |
| 6,736,181 B2 | 5/2004 | McNeely et al. | |
| 6,761,245 B2 * | 7/2004 | Porte | 181/290 |
| 7,797,809 B2 * | 9/2010 | Costa et al. | 29/458 |
| 2004/0060652 A1 | 4/2004 | McNeely et al. | |
| 2007/0275212 A1 * | 11/2007 | Stadtlander et al. | 428/116 |

OTHER PUBLICATIONS

European Search Report Dated Sep. 26, 2007.

* cited by examiner

REPAIR OF COMPOSITE SANDWICH STRUCTURES

This application is a divisional of U.S. application Ser. No. 11/455,570 filed on Jun. 19, 2006.

BACKGROUND OF THE INVENTION

This invention relates to composite materials and, more particularly, to repairing composite sandwich structures.

Composite structures are commonly known and used in, for example, gas turbine engines for aerodynamic fairings. One type of composite is a sandwich structure having a face skin and a back skin that are bonded to a honeycomb core. The face skin and back skin may be made of a metal sheet or a laminated structure with a resin matrix, such as epoxy, with one or more plies of reinforcement fibers. Often, the face skin, the back skin, or both are perforated for noise attenuation.

In some instances, it is desirable to repair a section of the face skin that has become damaged from an impact, elevated temperatures, abrasion, erosion, or other phenomenon rather than replace the entire face skin. A typical repair for this includes using a potting material to restore the aerodynamic profile of the face skin and provide load transfer across the damaged area. However, the potting material blocks some of the perforations, thereby decreasing the acoustic performance.

Alternatively, if the face skin is a laminated structure, one or more laminate plies may be removed and patched using what is known as a "scarf." Often, an oversized patch is placed over the repair area and is sized to create a lap joint in the area adjacent to the repair. The "scarf" repair method has a significant drawback in that the patch may peel off of the repair area or entirely liberate under extreme conditions.

Additionally, one trend has been to make the face skin as thin as possible to reduce weight and enhance acoustics. The thinness makes it difficult to use the traditional "scarf" repair method because there may only be one or two laminate plies. Furthermore, the "scarf" repair method is not even applicable for metal face skins. Thus, there is a need for a reliable repair method for laminated composite and metal face skins. This invention addresses those needs while avoiding the shortcomings and drawbacks of the prior art.

SUMMARY OF THE INVENTION

An example method of restoring a section of a composite includes the steps of removing an undesirable section of a composite and securing a repair section in the location of the removed undesirable section. One or more covers are secured on at least a portion the repair section to prevent or resist peeling of the repair section.

An example composite component includes a honeycomb, a skin bonded to the honeycomb, a repair section adjacent the skin, and one or more covers secured on at least a portion of the repair section to resist peeling of the repair section.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
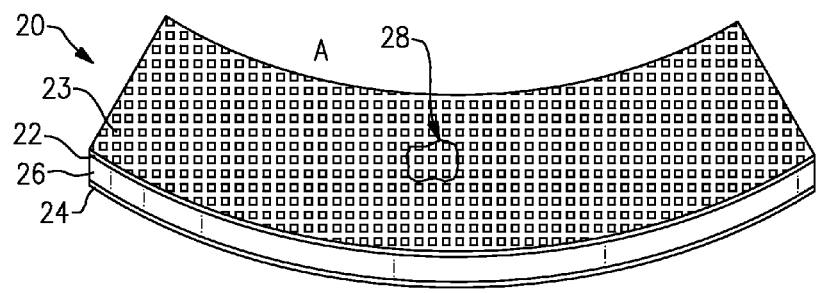
FIG. 1 illustrates an example composite structure having a damaged section.

FIG. 1 illustrates selected portions of an example composite structure 20, such as an acoustic composite sandwich structure used in a fan-bypass area or nacelle of a gas turbine engine for noise attenuation. In this example, an airflow side A of the composite structure 20 includes a face skin 22 having perforations 23 that extend through the thickness of the face skin 22. The face skin 22 and a back skin 24 are bonded to a honeycomb core 26 in a known manner to provide a composite sandwich structure. In one example, the face skin 22, the back skin 24, or both include composite layers, such as layers made of a resin matrix with continuous woven fiber reinforcement that are concurrently bonded to and compacted against the ends of honeycomb core 26. In another example, the face skin 22, the back skin 24, or both are made of a metal or metal alloy.

In the illustrated example, a section 28 (i.e., an undesirable section) of the face skin 22 has become damaged by, for example, an impact, elevated temperatures, abrasion, erosion, or other phenomenon. As will be described below, the damaged section 28 and a section of the honeycomb core 26 are replaced with a repair section 30 (FIG. 3) to repair the composite structure 20. Removal of the section of the honeycomb core 26 is optional. The repair section 30 is held in place using one or more covers 32 (FIG. 3) to resist peeling of the repair section from the composite structure 20.

Figure 2:
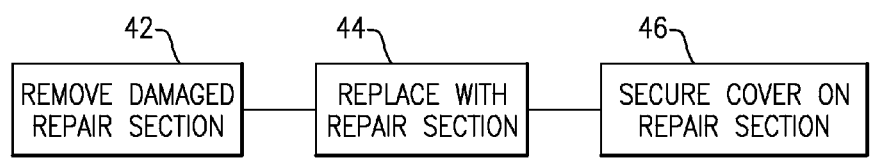
FIG. 2 illustrates an example method of repairing the composite structure.

Referring to the example shown in FIG. 2, the composite structure 20 is repaired in several steps. The damaged section 28 and a section of the honeycomb core 26 are locally removed at step 42. At step 44, the repair section 30 replaces the removed damaged section 28. At step 46, one or more covers 32 are secured on the repair section 30. As will be described below, the disclosed method is useful for both composite and metal face skins 22 and provides the benefit of reliably securing the repair section 30 to resist peeling from, for example, airflow over the composite structure 20 that induces aerodynamic shear loads.

Figure 3:
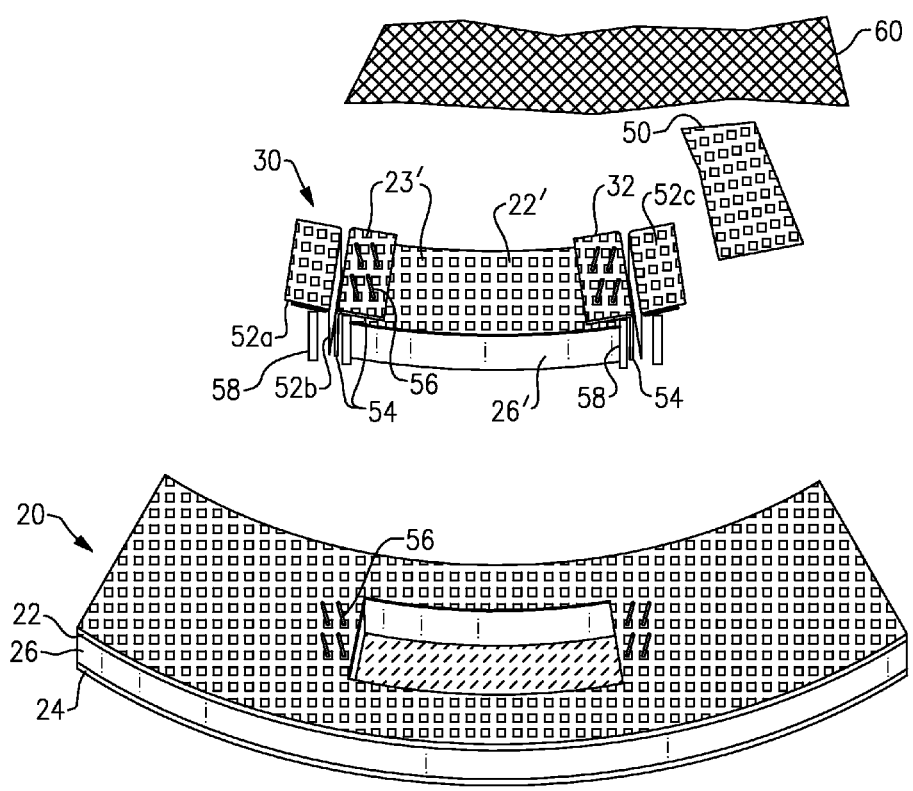
FIG. 3 illustrates an example of the composite structure after removal of the damaged section, including removal of a section of the honeycomb core.

FIG. 3 shows the composite structure 20 after the removal step 42. In the disclosed example, an area larger than the damaged section 28 is removed by, for example, mechanical cutting, grinding, scraping, or other known removal techniques or combinations thereof. In the illustrated example, a section of the honeycomb core 26 is also removed, however, if the honeycomb core 26 is undamaged, the honeycomb core 26 need not be removed.

The repair section 30 in this example includes a face skin 22' that is bonded in a known manner to a honeycomb core 26'. The size of the repair section 30 corresponds to the size of the void or large slot left from removing the damaged section 28. This provides the benefit of a close fit between the repair section and the remaining composite structure 20 such that there are no significant gaps.

The repair section 30 may include a variety of different configurations and materials, depending on the structural needs and materials of the composite structure 20. For example, the face skin 22' and covers 32 of the repair section 30 are made of the same material as the face skin 22 of the composite structure 20 (e.g., a resin matrix with continuous woven fiber reinforcement, a metal, or a metal alloy). Furthermore, the number of covers 32 used to secure the repair section 30 can vary depending on the structural needs to resist peeling. In one example, a tie cover 50 is secured on one or more of the covers 32 to further secure the covers 32 on the repair section 30.

In the disclosed example, opposing pairs of covers 32 are used at each end of the repair section 30. It is to be understood, however, that fewer covers 32 may be used in examples that require less peeling resistance and additional covers 32 may be used in examples that require even greater peeling resistance. Each of the covers 32 in the illustrated example is L-shaped and includes a first surface 52a and a second surface 52b that extends perpendicularly or transversely from the first surface 52a. Each opposing pair of covers 32 is oriented back-to-back such that the first surfaces 52a of one of the pair of covers 32 extends over the face skin 22' and the first surfaces 52a of each opposed cover 32 extends over the composite structure 20 adjacent the repair section 30.

In the disclosed example, the covers 32 and face skin 22' of the repair section 30 include perforations 23' in a pattern that matches a pattern of the perforations 23 in the face skin 22. The perforations 23' of one of the pair of opposed covers 32 align with the perforations 23' of the face skin 22', and the perforations 23' of the other opposed cover 32 align with the perforations 23 of the face skin 22. To align the perforations 23' of the covers 32, pins 56 are inserted into the perforations 23' of the face skin 22' and into the perforations 23 of the face skin 22. The pins 56 are long enough such that they extend from the perforations 23 and 23' and function as locators for aligning the perforations 23' of the covers 32. Alignment of the perforations 23 and 23' provides the advantage of maintaining the acoustic performance of the repaired composite structure 20.

An adhesive layer 54 is disposed between the first surfaces 52a and the respective face skins 22 and 22' to bond the covers 32 to the face skins 22 and 22'. In one example, the adhesive layer 54 is assembled with the covers 32 over the pins 56, however, those of ordinary skill in the art who have the benefit of this description will recognize other suitable methods for assembling the adhesive layer 54. Optionally, if the covers 32 are made with a resin, the resin may function as an adhesive in addition to or instead of the adhesive layer 54 to bond the covers 32 to the face skins 22 and 22'.

An adhesive material 58, such as a potting material or core splice, is applied to the ends of the second surfaces 52b of the covers 32. The amount of adhesive material 58 used can vary. In one example, the adhesive material 58 is a liquid or an expanding foam and fills a substantial portion of the volume surrounding the second surface 52b of the covers 32 (i.e., between the second surfaces 52b and the honeycomb cores 26 and 26'). In the disclosed example, the adhesive material 58 is also used to bond the honeycomb core 26' of the repair section 30 to the back skin 24. Alternatively, the adhesive material 54 is deposited onto the back skin 24 such that it will contact the ends of the covers 32 when the repair section 30 is inserted into the void left from removing the damaged section 28. The adhesive material 58 bonds the covers 32 to the back skin 24 and to the honeycomb cores 26 and 26'. This provides the benefit of locking the covers 32 in place over the repair section 30 to prevent or resist peeling of the repair section 30.

In the disclosed example, an adhesive layer 52c is also deposited on the covers 32, and a tie cover 50 is deposited onto the adhesive layer 52c. The pins 56 are used again as locators to align perforations 23' of the tie cover 50 with the perforations 23' of the covers 32. Alternatively, the adhesive layer 52c and tie cover 50 are assembled onto the covers 32 before placing the repair section 30 into the void. The tie cover 50 provides a shear bond between pairs of opposing covers 32 for additional peeling resistance.

In one example, if a resin matrix with continuous woven fiber reinforcement is used for the covers 32 and the face skin 22' of the repair section 30, the repair section 30 is concurrently compacted and heated using known compacting and heating techniques. This provides the benefit of curing the resin and consolidating the repair section 30 against the back skin 24.

Optionally, a wire mesh 60 is bonded in a known manner on the repair section 30 and adjacent composite structure 20. The wire mesh 60 provides the benefit of additional peeling resistance.

Figure 4:
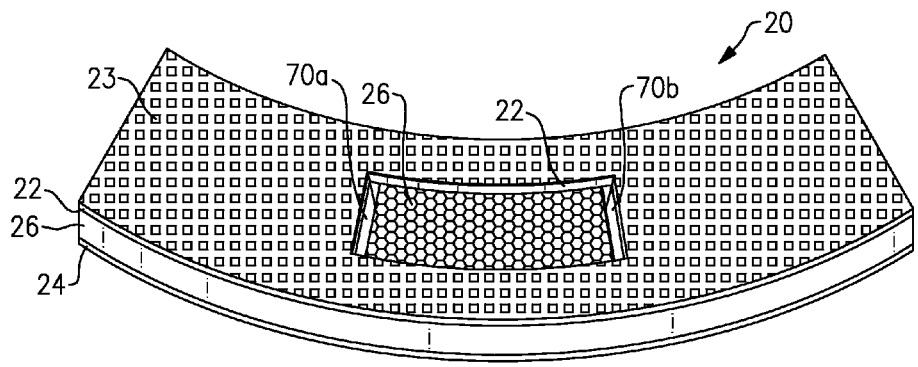
FIG. 4 illustrates an example of a composite structure after removal of a damaged section, wherein the honeycomb core is not removed.

FIG. 4 illustrates an example wherein the section of the honeycomb core 26 is not removed at step 42 and replaced. This example is substantially similar to the method described above except that slots 70a and 70b are cut into the honeycomb core 26 to receive the second surfaces 52b of the covers 32. The adhesive material 58 is deposited within the slots 70a and 70b to bond the covers 32 to the back skin 24 and honeycomb core 26.

Figure 5:
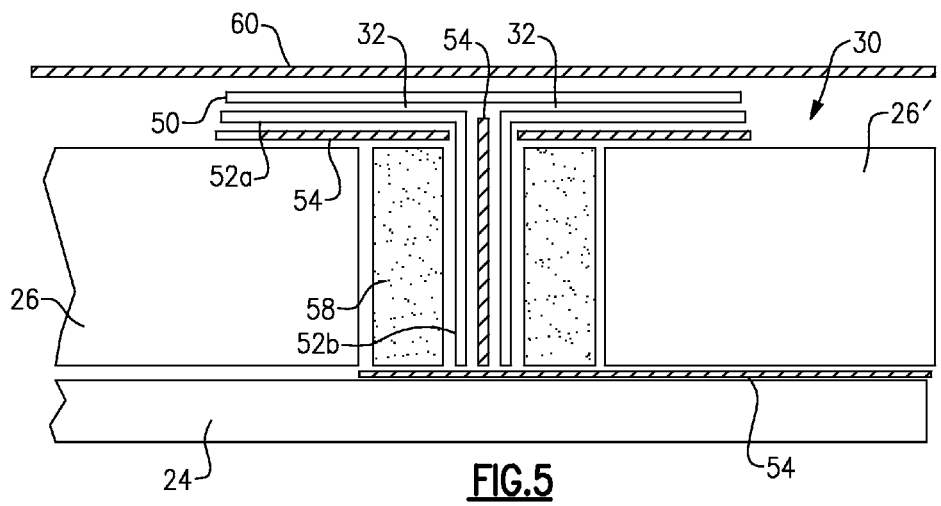
FIG. 5 illustrates a cross-sectional side view of an example repair section

FIG. 5 shows an exploded, cross-sectional view of the repair section 30 after the repair process.

Figure 6:
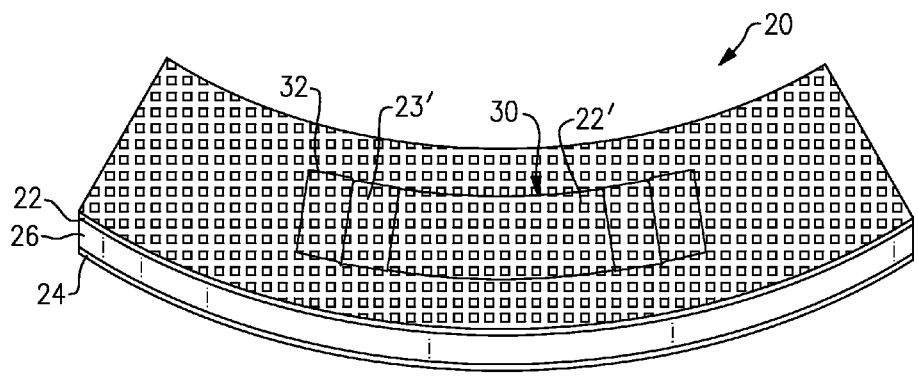
FIG. 6 illustrates the composite structure after the repair.

FIG. 6 shows a perspective view of the composite structure 20 after the repair process. The covers 32 are securely bonded by the adhesive layers 54 and the adhesive material 58 (potting) to provide the benefit of securing the repair section 30 to the composite structure 20 to resist peeling. Additionally, if there is a thickness mismatch between the face skin 22' of the repair section 30 and the face skin 22 of the composite structure 20, the covers 32 mitigate at least a portion of the aerodynamic losses that would typically occur as airflow passes over the abrupt transitions at mismatched portions.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A composite component comprising:
   a honeycomb;
   a skin bonded to the honeycomb;
   a repair section bonded adjacent the skin; and
   at least one cover secured on at least a portion of the repair section to resist peeling of the repair section, wherein the skin includes first perforations and the at least one cover includes second perforations that are aligned with the first perforations, wherein the at least one cover includes a first surface secured on at least the portion of the repair section and a second surface that extends in a direction transverse to the first surface, wherein the second surface extends into the honeycomb.

2. The composite component as recited in claim 1, further comprising an adhesive that bonds the second surface to the honeycomb.

3. The composite component as recited in claim 1, further comprising an opposing cover adjacent the at least one cover, and a tie cover that bonds the opposing cover and the at least one cover together.

4. The composite component as recited in claim 3, wherein the opposing cover comprises a first surface that extends over the repair section, and a second surface transverse to the first surface, wherein the at least one cover comprises a first surface that extends over the skin adjacent the repair section, and a second surface transverse to the first surface.

5. The composite component as recited in claim 4, wherein the second surface of the opposing cover and the second surface of the at least one cover are parallel and disposed at an axial end of the repair section.

6. The composite component as recited in claim 1, wherein the repair section includes third perforations aligned with the second perforations of the at least one cover.

7. The composite component as recited in claim 1, wherein the at least one cover includes a first cover secured on at least the portion of the repair section and a tie cover secured on the first cover.

8. The composite component as recited in claim 1, wherein the repair section and the skin are made of substantially the same material.

9. The composite component as recited in claim 1, wherein a portion of the at least one cover is above a face skin surface, and the remainder is imbedded below the face skin surface.

10. The composite component as recited in claim 1, wherein a wire mesh is bonded over the at least one cover and the repair section.

11. The composite component as recited in claim 1, wherein the skin is a face skin, wherein a back skin opposite the face skin is bonded to the honeycomb.

12. The composite component as recited in claim 11, wherein the face skin and the at least one cover are the same material.

13. The composite component as recited in claim 1, wherein the at least one cover secured on the at least a portion of the repair section resists peeling due to air flow.

14. The composite component as recited in claim 1, wherein the repair section comprises a repair face skin bonded to a replacement honeycomb core.

15. The composite component as recited in claim 1, wherein the face skin is a resin matrix with continuous woven fiber reinforcement.

16. The composite component as recited in claim 1, wherein the at least one cover is bonded by adhesive to the at least a portion of the repair section.

17. The composite component as recited in claim 1, wherein the face skin is a resin matrix with continuous woven fiber reinforcement, wherein the at least one cover is bonded by adhesive to the at least a portion of the repair section.

* * * * *